(12) United States Patent
Knutsen et al.

(10) Patent No.: US 11,673,731 B2
(45) Date of Patent: Jun. 13, 2023

(54) METHOD OF MAKING AN INJECTION MOLDED PRODUCT PACKAGING HAVING A HUMIDITY CONTROL MATERIAL

(71) Applicant: Boveda, inc., Minnetonka, MN (US)

(72) Inventors: Sean A. Knutsen, Chanhassen, MN (US); Robert L. Esse, Monticello, MN (US); Brian Rice, Greenfield, MN (US)

(73) Assignee: Boveda, Inc., Minnetonka, MN (US)

( * ) Notice: Subject to any disclaimer, the term of this patent is extended or adjusted under 35 U.S.C. 154(b) by 828 days.

(21) Appl. No.: 16/522,410

(22) Filed: Jul. 25, 2019

(65) Prior Publication Data

US 2020/0039723 A1 Feb. 6, 2020

Related U.S. Application Data

(60) Provisional application No. 62/713,751, filed on Aug. 2, 2018.

(51) Int. Cl.
| | |
|---|---|
| *B29C 45/16* | (2006.01) |
| *B65D 81/18* | (2006.01) |
| *B65D 25/00* | (2006.01) |
| *B29C 45/17* | (2006.01) |
| *B65D 81/26* | (2006.01) |
| *B29L 31/00* | (2006.01) |

(52) U.S. Cl.
CPC ............. *B65D 81/18* (2013.01); *B29C 45/16* (2013.01); *B29C 45/1643* (2013.01); *B29C 45/1704* (2013.01); *B65D 25/00* (2013.01); *B65D 81/266* (2013.01); *B29C 2045/1601* (2013.01); *B29C 2045/1715* (2013.01); *B29K 2995/0065* (2013.01); *B29K 2995/0069* (2013.01); *B29L 2031/712* (2013.01)

(58) Field of Classification Search
CPC ............... B29C 45/16; B29C 45/1643; B29C 2045/1715
See application file for complete search history.

(56) References Cited

U.S. PATENT DOCUMENTS

| | | | | |
|---|---|---|---|---|
| 4,174,413 | A * | 11/1979 | Yasuike | B29C 45/1643 215/12.2 |
| 4,407,897 | A * | 10/1983 | Farrell | B32B 7/12 428/688 |
| 5,114,003 | A * | 5/1992 | Jackisch | B65D 81/268 206/204 |
| 5,911,937 | A * | 6/1999 | Hekal | B01J 20/28033 264/165 |
| 5,936,178 | A | 8/1999 | Saari | |
| 6,130,263 | A * | 10/2000 | Hekal | B29C 45/16 524/550 |
| 6,921,026 | B2 | 7/2005 | Saari et al. | |
| 7,871,558 | B2 * | 1/2011 | Merical | B32B 27/18 264/537 |
| 8,110,260 | B2 * | 2/2012 | Merical | B65D 81/266 428/36.5 |

(Continued)

*Primary Examiner* — Edmund H Lee
(74) *Attorney, Agent, or Firm* — Padda Law Group

(57) ABSTRACT

The present disclosure, in one embodiment, relates to an injection molded container for holding a product, wherein the container is configured to house a humidity control product that may regulate the relative humidity of the inner body of the container such that the product housed therein may be kept at an optimal humidity.

12 Claims, 2 Drawing Sheets

(56) References Cited

U.S. PATENT DOCUMENTS

| | | | |
|---|---|---|---|
| 8,435,434 B1* | 5/2013 | Swenson | B65D 11/20 |
| | | | 264/328.8 |
| 8,491,290 B2* | 7/2013 | Swenson | B32B 3/04 |
| | | | 425/572 |
| 9,227,349 B2* | 1/2016 | Swenson | B29C 45/77 |
| 9,750,811 B2 | 9/2017 | Egberg et al. | |
| 2002/0006483 A1* | 1/2002 | Neteler | B65D 81/264 |
| | | | 428/35.2 |
| 2012/0006697 A1* | 1/2012 | Portier | B65D 81/264 |
| | | | 206/524.2 |
| 2013/0101696 A1* | 4/2013 | Swenson | B32B 27/306 |
| | | | 425/573 |
| 2015/0209988 A1* | 7/2015 | Swenson | B29C 45/164 |
| | | | 428/137 |

* cited by examiner

METHOD OF MAKING AN INJECTION MOLDED PRODUCT PACKAGING HAVING A HUMIDITY CONTROL MATERIAL

CROSS REFERENCE TO RELATED APPLICATION

The application claims priority to U.S. Provisional Application No. 62/713,751, filed Aug. 2, 2018, which is hereby incorporated herein in its entirety.

FIELD OF THE INVENTION

The present disclosure relates the use of injection molding processes for a container that incorporates a non-polymer functional product, where the functional product serves to regulate the humidity in the container.

BACKGROUND OF THE INVENTION

Injection molding of a polymer to create an end product made out of resin beads has been practiced for over a century. Closures for bottles, toys, components for automobiles, kitchen utensils and the like are a few examples of the ways this technology is used. The resin is melted to a polymer-appropriate temperature and then transferred in its molten phase into a metal mold that has a cavity which is the shape of the desired finished product. Multiple cavities can be filled simultaneously while the polymer is in this molten state. A brief cooling period will allow the polymer to "set" and then the mold can be opened, and the item being made removed. Additional steps of trimming etc. are often performed to perfect the item.

There have been a number of advancements within this field that include the co-extrusion of two or more different polymers that each might provide different functional properties for the end product. In some cases, color striping may be used with a unique extrusion head so that the same polymer can be molded into a package whereby one or more color pigments may be added to one area of the item, and a different color pigment(s) may be added to another area of the item. One concept currently being studied involves the injection molding of a container and a closure with a living hinge, all in one cycle of the machine.

Currently, there are a number of methods to regulate the relative humidity, or RH in a closed or confined space. For example, there are one-way humidity providing substances, whereby water or another hydration source may add humidity to a closed space. Alternatively, one-way desiccants may be used to draw moisture out of a closed space. Finally, two-way humidity control products exist that may regulate the RH in a confined space to a set RH, or RH range, such that if the closed space requires moisture to regulate to the set RH, the humidity control solution provides hydration. If the confined space has too much humidity for the set RH point, the humidity control solution may draw humidity from the closed space.

There is not currently a process whereby the benefits of injection molding are used to create a container that is comprised of two different substances, such that a humidity control product may be enclosed in the container between the two different substances. Therefore, there is a need for an injection molding process to create an end product that has two different materials, such that a humidity control product may be contained therein.

BRIEF SUMMARY OF THE INVENTION

The present disclosure, in one embodiment, relates to an injection molded product and process for a container that incorporates a humidity control product.

In one embodiment of the present disclosure an injection molded container is formed, whereby the container includes an outer wall that is liquid impermeable and substantially vapor impermeable. The container also includes an inner wall that is liquid impermeable and vapor permeable. The outer wall and inner wall form a hollow cavity therebetween; wherein the hollow cavity is filled with a humidity control product.

In another embodiment of the present disclosure a method of making an injection molded container for holding a product is disclosed. The method includes forming a mold that has two wall portions, including an inner wall and an outer wall portion, whereby a cavity is formed between the inner wall portion and the outer wall portion. The cavity has a cavity opening. The method further includes inserting a molten material that in a set phase will be liquid impermeable and substantially vapor impermeable into the outer wall portion of the mold. The method further includes inserting a molten material that in a set phase will be liquid impermeable and vapor permeable into the inner wall portion of the mold. Finally, the method includes inserting into the cavity opening a humidity control product.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

Figure 1A:
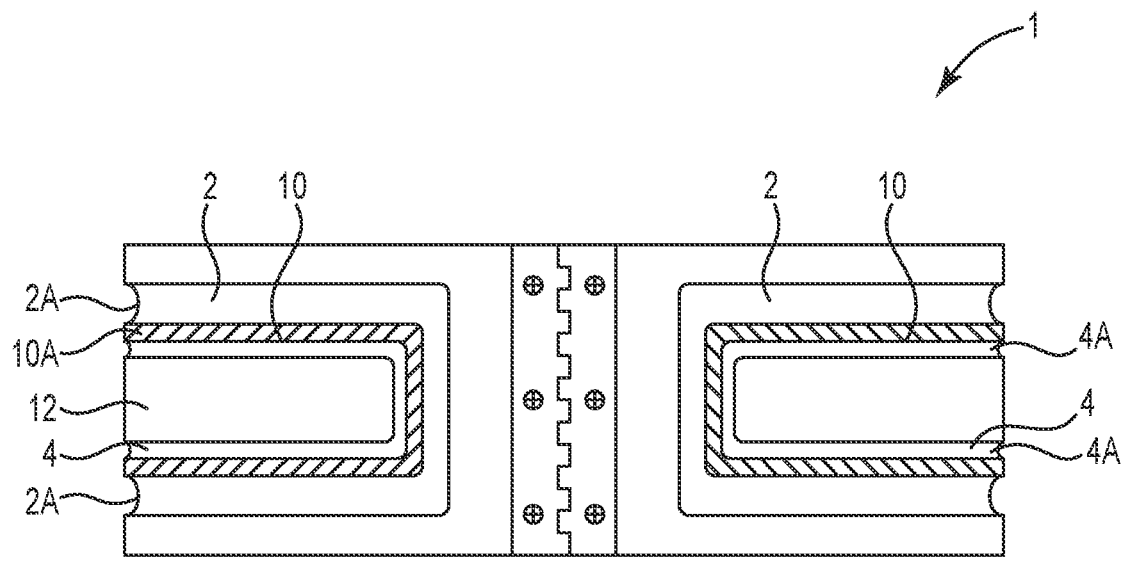
FIG. 1A shows one embodiment of the present disclosure of a mold for forming a container by injection molding.

The present disclosure relates to injection molded containers or packages. More particularly, the present disclosure relates to injection molded containers comprised of at least two different materials that facilitate the use of a humidity control product.

Products contained in a package, container, or other confined space often require a means to control the moisture level, or relative moisture ("RH") within the container so that the product is not harmed or ruined. The RH within the container can change or fluctuate over time for a number of reasons. For example, moisture can move into or escape from the inner body of a package or container when the package is opened and closed, and/or through minor leaks or tears in the packaging. In some cases, the initial RH of the container may not have been set at the optimum level for the product, and thus the container space RH may need to be adjusted immediately upon placement of the product in the container. Thus, including a moisture management system in or as part of the package or container may be critical to the usefulness and/or long-term preservation of a variety of products. These include for example cannabis which when too dry may crumble into undesirable powder or when too wet may result in harmful mold growth. Another product example is beef jerky which when too dry may become almost inedible in its hardness and when too wet can result in bacteria growth with significant negative implications.

In some embodiments of the present disclosure, an injection mold for a package or container is created such that a cavity is included in the package or container. The cavity may be so configured as to hold a humidity control product or agent. Accordingly, an outer wall portion of the container may be comprised of any suitable injection moldable material, such as a rigid or malleable plastic. In some embodiments the outer wall portion may be liquid impermeable, and substantially water vapor impermeable. For example, the outer wall in some embodiments may be comprised of low or impermeable water vapor transmission rate resins, including, but not limited to, polypropylene, acrylonitrile butadiene styrene, and/or low density polyethylene.

An inner wall of the container may be adjacent to the inner cavity space that contains the product or item. The inner wall may be comprised of an injection moldable material that is liquid impermeable, but that is permeable to water vapor. For example, the inner wall may be comprised of, but not limited to the following, thermoplastic elastomer, polyethylene terephthalate, polystyrene, and/or polylactic acid.

The packaging or container of the present disclosure may be so configured such that a cavity is formed between the outer and inner walls. The humidity control product may be positioned within the cavity. The humidity control product may take any form, it may be a solid, gel, liquid, paste, powder, pellets, or any other form or combination of forms. The humidity control product may have any consistency. Further, the humidity control product may be a one-way or a two-way product depending on the goals and specification of the end product and the nature of the product or item to be held in the package or container. In some embodiments the humidity control product may be loose or free flowing. In other embodiments, the humidity control product may be contained in a packaging of its own, such as a packet, pouch, capsule, or tablet, for example which is also configured to be liquid impermeable and vapor permeable. In embodiments that contain a free flowing or loose humidity control product, the container may require a seal or closure once the humidity control product has been placed inside of the cavity. For example, the cavity may be closed after the humidity control agent is inserted in the cavity. The sealed cavity may thus prevent or mitigate spilling or leakage of the humidity control agent as the package is shipped or moved into a variety of vertical and inverted or horizontal positions during usage.

In some embodiments, the seal may be a permanent seal that may not be configured to be re-opened. In other embodiments, the seal may be configured such that it may be securably opened and closed to allow the humidity control product to be removed and/or replaced. In other embodiments, for example where the cavity between inner and outer wall portions of the container is configured to form a slot in the inner body of the container, a self-contained humidity control packet may be placed in the slot. The slot opening in some embodiments may be sealed and closed off, while in other embodiments the slot opening may remain unsealed, such that the humidity control packet or product may be removed and/or replaced.

In some embodiments, the humidity control product may be a liquid, including water that may be a one-way solution that may add humidity in the form of water vapor to the inner compartment of the container to raise the RH level inside of the container. The hydrating product may be positioned between the outer wall and inner wall that forms a cavity, whereby the outer wall is liquid impermeable and substantially vapor impermeable, and the inner wall is liquid impermeable and vapor permeable. Thus, when the RH of the inner body of the container is lower than the RH of the cavity of the container, water vapor will move from the cavity into the inner body of the container through the vapor permeable inner wall of the container. In this way, the RH of the inner body of the container will increase. Any hydrating material or combination of materials may be used, in any useful quantity.

Conversely, the humidity control product may be a desiccant that may be configured to draw moisture out of the inner compartment of the container to lower the RH level inside of the container. The desiccant product may be any known or after-arising desiccant material, including but not limited to, for example, silica gel, bauxite, calcium sulfate and/or montmorillonite clay. The desiccant may be used in any useful quantity.

In still other embodiments, the humidity control product may be a two-way humidity control product that regulates the RH of the inner body of the container to a set RH or RH range. Thus, when the RH of the inner body of the container falls below the set RH, vapor from the humidity control product will move from the container cavity through the vapor permeable/liquid impermeable inner container wall into the inner body of the container to raise the RH level to the set level. When the RH of the inner body of the container becomes higher than the set RH, the humidity control product will draw water vapor from the inner body of the container into the cavity of the container through the liquid impermeable/vapor permeable inner wall of the container. The set RH or RH range may be any useful RH or RH range for a given product of interest. For example, if the product of interest is *cannabis*, the set RH range may be around 62%.

The two-way humidity control product or agent may be comprised of a solid, a dispersion, an emulsion, a gel, or a saturated or unsaturated aqueous solution comprised of a salt, sugar, polyol such as glycerin or propylene glycol, glycerol, mannitol, sorbitol, xylitol, amino acid, or other solute modulating the relative humidity. For example, in some embodiments, the humidity control agent may be or include a saturated or unsaturated salt solution, such as those described in U.S. Pat. No. 9,750,811, entitled Devices and Methods for Controlling Headspace Humidity and Oxygen Levels, filed Sep. 15, 2015; U.S. Pat. No. 5,936,178, entitled Humidity Control Device, filed Jun. 10, 1997; and/or U.S. Pat. No. 6,921,026, entitled Preservation of Intermediate Moisture Foods by Controlling Humidity and Inhibition of Mold Growth, filed Feb. 5, 2002, the content of each of which is hereby incorporated herein by reference in its entirety. In other embodiments, other suitable materials for controlling humidity may be used as the humidity control agent. In at least one embodiment, the humidity control agent may be comprised of a saturated aqueous salt with alkali metal formate therein, or may be comprised of a glycerol.

Regardless of whether the humidity control product is a one-way product or a two-way humidity control product, in some embodiments, one or more additives may be combined with the humidity control agent, including but not limited to the additives described in U.S. patent application Ser. No. 14/854,159, U.S. Pat. Nos. 5,936,178, and/or 6,921,026, the contents of each of which are hereby incorporated herein by reference. For example, some additives may be used to increase or otherwise control viscosity levels of the humidity control agent. One example of an additive is one or more gums for thickening or altering the viscosity of the humidity control agent. For example, in some embodiments, between approximately 1% and approximately 3% of the humidity control agent may comprise one or more gums. Other additives may include one or more salts, water, oxygen control agents, odor control or enhancing agents, and/or other additives.

In some embodiments, the injection mold of the container of the present disclosure may be filled via a dual injection process. For example, the process may include an inner permeable resin being heated to flow rate and injected into the mold cavity; when the permeable resin is still in a medium viscosity that may allow it to bond to the second resin, the gate holding the impermeable resin at a flowable temperature may open to allow it to flow around the inner wall, creating a solid bond at the seams. The mold may have an air port that may add air pressure to create the cavity between the two walls. The filled mold may rapidly cool via means of water or glycol for example. The port where the air pressure was applied may now serve as the opening through which the humidity control agent may be introduced. After the cavity is filled to the desired volume, the port may then be sealed shut with a heated nozzle, for example thereby providing a water tight seal. As discussed above, the mold is configured such that a cavity may be formed between an inner wall portion of the container and an outer wall portion of the container. In some embodiments, the cavity is filled with a humidity control agent during the injection molding process.

In other embodiments the mold would be removed and filled at a different place and or time from the injection molding process. In some embodiments, the cavity may be filled substantially shortly after or immediately after the injection molding process has created the container, but not as part of the injection molding process. In some embodiments, the area where the non-polymer product is being placed may have cooled so that the product (which may contain water, for example) does not immediately flash off into water vapor. There may be less concern with temperature conditions if the product is a dry powder, for example, which is one variation of this disclosure.

In some cases, it may be beneficial to fill the cavity closer in time to when the product may be placed into the container and/or when the final end product is intended for use and/or sale. In such cases, filling the cavity at the time of injection molding may not be desired.

FIG. 1A shows an injection mold 1 for one embodiment of a container of the present disclosure. As may be seen, the mold includes an outer mold wall 2 and an inner mold wall 4. The outer mold wall 2 and inner mold wall 4 are separated a useful distance so as to create a cavity 10 between the two mold walls 2, 4. The outer mold wall 2 may be liquid impermeable and substantially vapor impermeable, as discussed above. Outer mold wall 2 may have any desired thickness and may be made of any material or combination of materials that may be injection molded and have the properties of being liquid impermeable and substantially vapor impermeable. The outer wall may be substantially rigid, or it may have a degree of malleability. The inner mold wall 4 may be liquid impermeable but vapor permeable. The inner mold wall 4 may have any desired thickness and may be made of any material or combination of materials that may be injection molded and have the properties of being liquid impermeable and vapor permeable. The material and/or thickness of the inner mold wall 4 should be such that the item being contained in the container will not be able to puncture or otherwise rupture the wall. While the shape of the container mold 1 is generally that of a rectangular cup, it will be understood that the shape of the container mold may be any desired shape and size.

Cavity 110 is shown as having the same relative shape as the container formed by outer and inner mold walls 2, 4. This may be desired for embodiments that include a cavity 110 that is filled almost entirely with a humidity control product. In other cases, however, the cavity 110 may be only partially filled with a humidity control agent. In other embodiments, the injection mold may contain barriers that block off some portion of the cavity, such that only a portion of the cavity space may be filled with a humidity control agent.

During the injection molding process, the mold 1 is closed at the hinge 12. The material used to form outer container wall 102 may be injected in molten form into mold outer wall fill point 2A. Simultaneously or sequentially, the material used to form container inner wall 103 may be injected in molten form into mold inner wall fill point 4A. In some embodiments, simultaneously or sequentially, the humidity control agent may be inserted into cavity fill point 10A. In embodiments, where the humidity control agent is filled as part of the injection molding process, the cavity fill point 10A may be sealed. The cavity fill opening may be sealed immediately after filling or it may be sealed sometime after the container mold has had time to set. Sealing may be accomplished by any known means. For example, sealing may be accomplished by using a heat assisted crimping method and/or ultrasonic method.

In other embodiments, the cavity may be filled with a humidity control agent and a different place and/or time from the injection molding process.

Figure 1B:
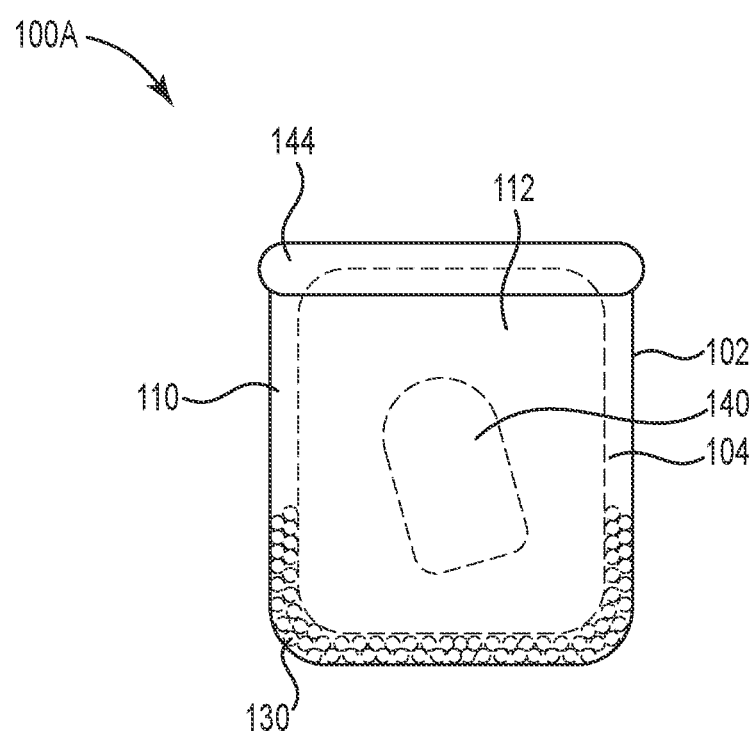
FIG. 1B shows the end-product container formed by the mold shown in FIG. 1A, according to one embodiment of the present disclosure.
Figure 2:
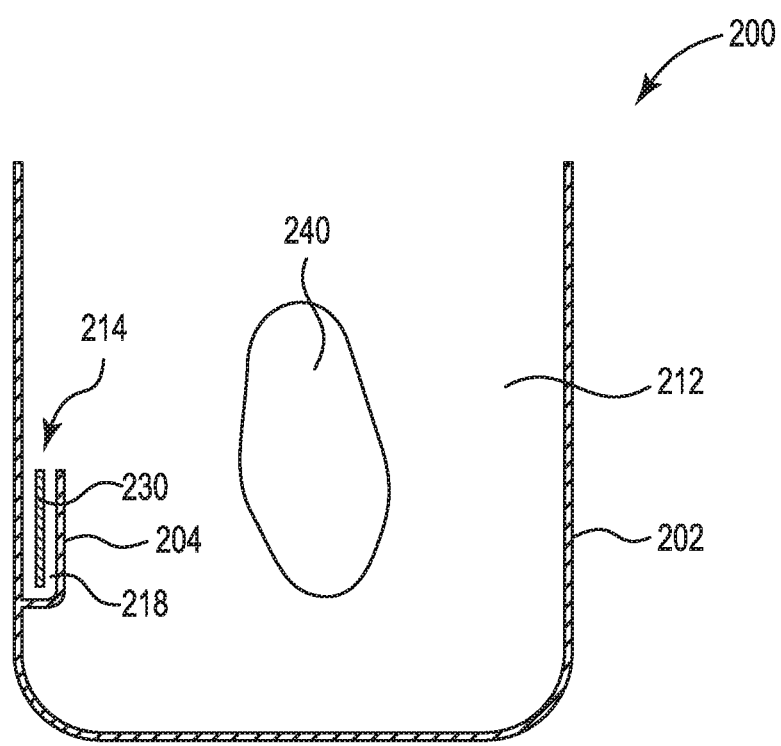
FIG. 2 shows another embodiment of an injection molded container of the present disclosure.

The final end product created as a result of the mold and process shown with reference to FIG. 1A is shown in FIG. 1B. Container 100A contains container outer wall 102, container inner wall 104, cavity 110 that is filled with humidity control agent 130. Cavity fill opening has been sealed 144. In some embodiments, container 100A will include a cover, cap, lid, or other closing mechanism so that the inner body of the container 112 is not exposed to external air and humidity. The cover may be of any suitable material and may secure the opening in any suitable way. Container 100A further includes a product or item 140 that may desirably be kept at an optimum humidity point.

In another embodiment, the injection mold is configured to create container 200. Container 200 includes outer wall 202 that is liquid impermeable and substantially vapor impermeable. Container 200 also has inner wall 204 that is liquid impermeable and vapor permeable. Inner wall 204 and outer wall 202 form cavity 218 that may be essentially a slot. It will be understood that the mold may be configured to create a cavity or slot of generally any size and shape. In some embodiments, a self-contained humidity control product may be placed in the slot. In such embodiments the cavity opening 214 may or may not be sealed. In embodiments where the cavity opening 214 is sealed, the humidity control pouch will not be able to move out of the cavity 218 into the inner body of the container 212. This may be beneficial, if it is desirable to ensure that the product or item 240 does not come in contact with the humidity control product. Alternatively, if the cavity opening 214 remains unsealed, this may allow a user to replace the humidity control product 230 when the humidity control product 230 has reached the end of its useful life. In some embodiments, container 200 will include a cover, cap, lid, or other closing mechanism so that the inner body of the container 212 is not exposed to external air and humidity. The cover may be of any suitable material and may secure the opening in any suitable way.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

In the foregoing description various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A method of making an injection molded container for holding a product, the method comprising:
   forming an injection mold that has two wall portions, including an inner wall and an outer wall, whereby a cavity is formed between the inner wall portion and the outer wall portion, the cavity having a cavity opening;
   injecting a molten material that in a set phase will be liquid impermeable and substantially vapor impermeable into the outer wall portion of the mold;
   injecting a molten material that in a set phase will be liquid impermeable and vapor permeable into the inner wall portion of the mold; and
   inserting into the cavity opening a humidity control product.

2. The method of making an injection molded container for holding a product of claim 1, further comprising sealing the cavity opening after the cavity has been filled with the humidity control product.

3. The method of making an injection molded container for holding a product of claim 2, wherein the humidity control product is a one-way humidity control product.

4. The method of making an injection molded container for holding a product of claim 3, wherein the humidity control product is liquid water.

5. The method of making an injection molded container for holding a product of claim 2, wherein the humidity control product is a desiccant.

6. The method of making an injection molded container for holding a product of claim 1, wherein the humidity control product is a two-way humidity control product.

7. The method of making an injection molded container for holding a product of claim 6, wherein the humidity control product is a loose, free-flowing humidity control product.

8. The method of making an injection molded container for holding a product of claim 7, further comprising sealing the cavity opening after the cavity has been filled with the humidity control product.

9. The method of making an injection molded container for holding a product of claim 6, wherein the humidity control product is a self-contained humidity control product.

10. The method of making an injection molded container for holding a product of claim 9, wherein the humidity control product is optimized to set the RH range of an inner body of the container to about 62%.

11. The method of making an injection molded container for holding a product of claim 6, wherein the humidity control product is optimized to set the RH range of an inner body of the container to about 62%.

12. The method of making an injection molded container for holding a product of claim 6, wherein the humidity control product is optimized to set the RH range of an inner body of the container to between about 50% and 80%.

* * * * *